United States Patent [19]
Frey et al.

[11] 4,444,959
[45] Apr. 24, 1984

[54] WATER-SOLUBLE BENZYLATED POLYAMIDOAMINES

[75] Inventors: Guenter Frey, Dannstadt-Schauernheim; Werner Streit, Bobenheim; Rolf Fikentscher, Ludwigshafen; Hans-Juergen Degen, Lorsch; Wolf Guender, Neustadt, all of Fed. Rep. of Germany

[73] Assignee: BASF Aktiengesellschaft, Ludwigshafen, Fed. Rep. of Germany

[21] Appl. No.: 350,407

[22] Filed: Feb. 19, 1982

[30] Foreign Application Priority Data

Mar. 25, 1981 [DE] Fed. Rep. of Germany ....... 3111713

[51] Int. Cl.³ .............................................. C08G 69/48
[52] U.S. Cl. ................................... 525/435; 162/162; 162/164.6; 525/420; 528/341; 528/342; 528/347
[58] Field of Search ............... 525/435, 420; 528/341, 528/342, 347

[56] References Cited

U.S. PATENT DOCUMENTS 3,397,161  8/1968  Miller ................................. 525/435
4,371,674  2/1983  Hertel et al. ....................... 525/435

*Primary Examiner*—Harold D. Anderson
*Attorney, Agent, or Firm*—Oblon, Fisher, Spivak, McClelland & Maier

[57] ABSTRACT

Water-soluble benzylated polyamidoamines which contain from 0.1 to 0.9 mole of benzyl groups per equivalent of nitrogen, and onto which from 20 to 400 parts by weight of ethyleneimine or propyleneimine have been grafted per 100 parts by weight of polyamidoamine, processes for the preparation of the materials, and the use of the materials as cationic assistants in processes for coloring paper with acid dyes and/or direct dyes in an aqueous medium. The papers obtained show a high color strength, with substantially no two sidedness of the coloration.

6 Claims, No Drawings

WATER-SOLUBLE BENZYLATED POLYAMIDOAMINES

To reduce or prevent color twosidedness of filled papers which have been wet end-colored with cationic dyes, German Laid-Open Application DOS No. 2,012,217 proposes a process wherein coloring is carried out in the presence of cationic polymeric compounds and the cationic dyes are added to the stock only after addition of the said compounds. However, the conventional paper-coloring assistants are insufficiently effective when acid dyes or direct dyes are employed.

It is an object of the present invention to provide effective cationic assistants for various applications, for example for processes for coloring paper with acid dyes and/or direct dyes in an aqueous medium, with which assistants it is possible to produce papers which exhibit high color strength with substantially no twosidedness of the coloration.

We have found that this object is achieved, according to the invention, by providing water-soluble benzylated polyamidoamines which contain from 0.1 to 0.9 mole of benzyl groups per equivalent of nitrogen and onto which from 20 to 400 parts by weight of ethyleneimine or propyleneimine have been grafted per 100 parts by weight of polyamidoamine. Particularly effective cationic assistants for the paper industry are obtained when the water-soluble benzylated polyamidoamine is modified, in a second step, by reaction with cyanamide and/or dicyandiamide.

The starting materials for the preparation of the novel substances are water-soluble condensates which contain carboxamide groups and onto which alkyleneimine units have been grafted. A plurality of processes for the preparation of such substances are known. In the main, the polyamidoamines are obtained by reacting a dicarboxylic acid of 4 to 10 carbon atoms with a polyalkylenepolyamine having from 3 to 10 basic nitrogen atoms per molecule. Examples of suitable dicarboxylic acids are succinic acid, maleic acid, adipic acid, glutaric acid, suberic acid, sebacic acid and terephthalic acid. Mixtures of dicarboxylic acids, for example of adipic acid and maleic acid, may also be used. The use of adipic acid is preferred. These carboxylic acids are condensed with polyalkylenepolyamines, or mixtures of polyalkylenepolyamines, which contain from 3 to 10 basic nitrogen atoms per molecule, e.g diethylenetriamine, triethylenetetramine, tetraethylenepentamine, dipropylenetriamine, tripropylenetetramine or dihexamethylenetriamine. The amines may or may not contain up to 10% by weight of a diamine, eg. ethylenediamine or hexamethylenediamine. The condensation of the dicarboxylic acid with the polyalkylenepolyamine is preferably carried out in the absence of a solvent but may also be carried out in the presence of a solvent which is inert to the reactants. The condensation temperature is from 80° to 200° C. The water formed during the reaction is distilled from the system. The condensation can also be carried out in the presence of a lactone or lactam of a carboxylic acid of 5 to 12 carbon atoms, these products being built into the polyamidoamine. From 0.8 to 1.4 moles of polyalkylenepolyamine are used per mole of dicarboxylic acid.

Carboxamide-containing condensates are also obtained by reacting an acrylic ester or methacrylic ester with a diamine (preferably of 2 to 6 carbon atoms), eg. ethylenediamine, hexamethylenediamine or one of the above oligoamines or polyalkylenepolyamines. The acrylic or methacrylic ester is derived from a monohydric alcohol of 1 to 18, preferably 2 to 8, carbon atoms. A further possible method of preparation of appropriate compounds is to condense a urea with bis-aminoethylmethylamine.

The above carboxamide-containing water-soluble condensates are subjected to cationic modification by introduction of alkyleneimine units. A simple method is, for example, to graft the alkyleneimine, especially ethyleneimine, onto the condensate in the presence of a Lewis acid, eg. boron trifluoride etherate or sulfuric acid. For the grafting reaction, from 20 to 400, preferably from 50 to 300, parts by weight of ethyleneimine and/or propyleneimine are used per 100 parts by weight of carboxamide-containing condensate. Products of this type are known, for example, from German Published Application DAS No. 2,434,816.

Compounds containing alkyleneimine groups can also be prepared by reaction of a mono-(aminoalkyl) sulfate with the carboxamide-containing condensate at an alkaline pH. For example, the carboxamide-containing condensate can be aminoethylated by reacting the product with mono-($\beta$-aminoethyl) sulfate.

The polyamidoamines are water-soluble. They are preferably reacted in aqueous solution with benzyl chloride at from 50° to 150° C., preferably from 70° to 100° C. If the reaction temperature is above 100° C., the reaction is carried out under superatmospheric pressure. Per equivalent of nitrogen in the polyamidoamine, from 0.1 to 0.9, preferably from 0.3 to 0.6, mole of benzyl chloride is employed.

The benzylated alkyleneimine-modified polyamidoamines can be further modified by reacting them, in a further step, with cyanamide or dicyandiamide or a mixture of these. From 1 to 100, preferably from 5 to 20, parts by weight of cyanamide and/or dicyandiamide are used per 100 parts by weight of the benzylated polyamidoamine. The reaction is carried out in aqueous solution at from about 70° to 100° C.

The concentration of the aqueous solution used for benzylation can vary within a wide range and may be, for example, from 1 to 70, preferably from 20 to 60%, by weight. Similar remarks apply to the reaction of the benzylated product with cyanamide or dicyandiamide. It is also possible to react the polyamidoamine first with dicyandiamide or cyanamide and then the benzyl chloride. The benzylated ethyleneimine-modified polyamidoamines and the products modified, in an additional step, with cyanamide and/or dicyandiamide, may be used for various purposes in the paper industry, and also as additives in electroplating baths, and as additives to concrete to accelerate hardening. An important use of the novel products is as cationic assistants in processes for coloring paper with acid dyes and/or direct dyes in an aqueous medium. In these processes, the paper may either be wet end-colored before sheet formation or be colored afterwards.

Suitable dyes for coloring paper are acid dyes, direct dyes and mixtures of dyes of the two categories. The dyes belonging to the said categories may be found in the Color Index. For example, acid dyes are given on pages 1,003–1,560 of the Color Index, Volume 1, 3rd edition, The Society of Dyers and Colorists and American Association of Textile Chemists and Colorists. Some examples of typical acid dyes which are particularly suitable for coloring paper are the yellow acid dyes C.I. 13,065 and C.I. 47,035, the orange acid dyes C.I. 13,090, C.I. 15,575 and C.I. 15,510 and the red acid dyes C.I. 45,380 and C.I. 15,620. Direct dyes are given in the Color Index, Volume 2, pages 2,007–2,477. Typical direct dyes conventionally used for coloring paper are the yellow direct dyes C.I. 29,000, C.I. 24,895, C.I. 13,950, C.I. 29,025, C.I. 40,000, C.I. 40,001 and C.I. 24,890, the orange direct dyes C.I. 40,215, C.I. 40,265 and C.I. 29,156, the red direct dyes C.I. 29,175, C.I. 28,160, C.I. 22,120 and C.I. 25,410, the blue direct dyes C.I. 23,155 and C.I. 24,340 and the violet direct dye C.I. 25,410.

When the paper is dyed, the materials according to the invention are preferably added to the paper stock, ie. dyeing is effected during manufacture of the paper. For this purpose, acid dyes, direct dyes or a mixture of dyes of both the categories mentioned, and the cationic assistant, are added to the paper stock and the latter is drained in the conventional manner on a papermaking machine. The colored paper is thus obtained direct. This process step can also be combined with paper sizing by adding a pulp-sizing agent to the stock. The sequence of adding the dyes and cationic assistant to the stock does not critically affect the coloration obtained. It is possible to add a mixture of the appropriate dyes and the cationic assistant to the stock, or to add the dyes first and then the cationic assistant, or to add the assistant first, followed by the dyes. The wet end-coloring of paper in general requires from 0.1 to 10% by weight of dye, based on dry paper fibers. The amount of cationic assistant employed is from 10 to 300, preferably from 30 to 150%, by weight, based on dye. The dyeing process can be carried out over a wide temperature range, for example from room temperature to about 60° C., preferably from 20° to 50° C.

However, the paper can also be dyed after sheet formation, by applying the water-soluble ethyleneimine-modified benzylated polyamidoamine and one or more of the relevant dyes successively to the surface of the paper, for example by spraying the paper with the assistant and then applying the dye in a sizing press. Equally, it is possible first to treat the stock with the benzylated polyamidoamine and then to apply an aqueous solution of the dye in the sizing press. Yet again, the dye can be added to the stock and the benzylated polyamidoamine applied to the surface of the paper in the sizing press. It is merely important that coloring be carried out in combination with the cationic assistant. When drying paper which has been colored with acid dyes, it is often found in practice that the color is different on the two sides (an effect referred to as cylinder twosidedness). This means that the top and bottom faces of the colored paper produced differ in color strength or in hue, or in both. This color twosidedness is as a rule regarded as a substantial lowering of the quality of the paper. Using the materials according to the invention, deep and virtually identical colorations are obtained on the top and bottom faces of the paper formed. The materials according to the invention have the advantage over conventional cationic polymeric assistants that in paper coloring substantially better dye retention is achieved. The papermaking machine waste water contains at most about half as much unutilized dye as waste water from papermaking machines operated with coloring processes employing conventional assistants. Finally, the colored papers show very little bleeding in contact with other materials, for example other papers, foodstuffs or textiles, in the presence of a wetting fluid, eg. water, milk, aqueous alcohol or soap liquor.

In the Examples, parts and percentages are by weight. The cylinder towsidedness was assessed by the following laboratory method:

Colored paper sheets were produced on a laboratory sheet-forming apparatus, and before drying the moist colored sheet on a felt-covered cylinder at 90° C., a water vapor-impermeable plastic disc was placed on the felt side of the moist paper sheet. During drying, the plastic disc acted as a barrier to the water vapor, so that the latter had to evaporate from the sides. Since the cylinder twosidedness results from migration of the dye with the water vapor escaping from the paper sheet, the phenomenon is particularly easily observed with the experimental arrangement described above. If the coloration exhibits cylinder twosidedness, the paper under the plastic disc shows partial or complete depletion of dye. The twosidedness was assessed by comparing the color strength of the area covered by the plastic disc with the color strength of the remainder of the paper sheet.

| Assessment of cylinder twosidedness | Reduction of color strength, relative to surface not covered with plastic disc |
| --- | --- |
| very marked | 50–100% |
| marked | 30–50% |
| distinctly noticeable | 15–30% |
| noticeable | 5–15% |
| none | 0–5% |

Applying the assessment "none" to a loss of color strength of from 0 to 5% corresponds to the fact that differences in the color strength of this order of magnitude are very difficult to perceive with the human eye and are therefore immaterial in practice.

EXAMPLE 1

A polyamidoamine was first prepared by mixing 1,044 parts of water and 2,150 parts of diethylenetriamine under nitrogen at room temperature and adding 2,800 parts of adipic acid, with cooling. The reaction mixture was then heated so that the water originally added as well as the water formed during the condensation distilled off. Continuous distillation of the water for 5 hours resulted in a temperature of 170° C. in the distillation vessel. This temperature was maintained until the resin had an acid number of less than 10; this was reached after about 10 hours. The resin was cooled and, when the temperature had reached 130° C., 3,100 parts of water were added. An aqueous solution of 61.4% solids content was obtained.

The polyamidoamine thus obtained was grafted with ethyleneimine. To do so, 326 parts of the 61.4% strength resin were mixed with 4.5 parts of concentrated sulfuric acid in 70 parts of water and the mixture was heated to 80° C. 200 parts of a 50% strength aqueous ethyleneimine solution were then run in over 5 hours, with thorough mixing, after which the reaction mixture was kept at 80°–90° C. for a further 2–3 hours. The reaction can be regarded as complete only when ethyleneimine is no longer detectable with p-nitrobenzylpyridine. A 50.8% strength aqueous solution of an ethyleneimine-grafted polyamidoamine was obtained. The amine content of the product (determined by titration, in glacial acetic acid, with perchloric acid) was 5.2 milliequivalents/g, and the viscosity (determined in a 45% strength aqueous solution at 20° C. by the Höppler falling ball method) was 393 mPa.s.

This product was benzylated by mixing 192 parts of the 50.8% strength aqueous resin solution with 311 parts of water, heating the mixture to 80° C. and combining it, in the course of half an hour, with 76 parts of benzyl chloride at about 80°–90° C. After completion of addition of the benzyl chloride, the reaction solution was heated for 1 hour at 90° C. and then cooled. A 30.1% strength aqueous solution of a benzylated ethyleneimine-grafted polyamidoamine was obtained, which contained 0.6 mole of benzyl grops per equivalent of nitrogen and had a chloride titer of 1.038 milliequivalents/g.

The reaction product is used as a cationic assistant in coloring paper with acid dyes and/or direct dyes, by wet-end coloring or after sheet formation.

EXAMPLE 2

579 parts of the 30.1% strength ethyleneimine-modified polyamidoamine reacted with benzyl chloride, as described in Example 1, were heated to 90° C., an aqueous solution of 13 g of cyanamide in 13 g of water was added, and the batch was kept at 90° C. or 5 hours, with thorough mixing. The reaction mixture was then diluted with 144 g of water and cooled. 749 g of a cyanamide-treated benzylated imine-modified amidoamine are obtained.

The cationic assistant is used, at the rate of 0.5–1 g per liter, as a brightener in an alkaline, cyanide-free galvanizing bath, uniform, bright zinc coatings are obtained.

EXAMPLE 3

258 parts of methyl acrylate were introduced into a 1 liter four-necked flask equipped with a stirrer, reflux condenser, thermometer and dropping funnel, and were heated to 80° C. by means of an oil bath. 162 parts of ethylenediamine were added dropwise over 1 hour, with stirring, and the reaction mixture was then heated for 2 hours to 95° C. under reflux. 92 parts of methanol were then distilled from the reaction mixture over 5 hours at 135°–140° C. Thereafter, the mixture was cooled to 120° C. and mixed slowly with 328 parts of water. 656 parts of a 50% strength aqueous resin solution having a viscosity of 350 mPa.s were obtained. 10 g of concentrated sulfuric acid were then added to the solution, followed by 820 parts of 60% strength aqueous ethyleneimine solution introduced at 90° C., with cooling of the reaction mixture. The reaction was complete after 5 hours at 90° C. 1,486 g of an ethyleneimine-modified polyamidoamine containing 55.9% of active ingredient were obtained. 100 parts of the 100% strength resin contained 1.6 moles of nitrogen, corresponding to 16 milliequivalents/g.

224 g of the 55.9% strength ethyleneimine-modified polyamidoamine, in a 1 liter four-necked flask equipped with a stirrer, reflux condenser, thermometer and dropping funnel, were heated to 85°–90° C. in an oil bath. The oil bath was then removed and 76 g of benzyl chloride were added dropwise to the reaction mixture at a rate which enabled the temperature to be maintained at 90° C. After all the benzyl chloride had been added, the solution was stirred for a further half-hour at 90° C. and was then diluted with 102 g of distilled water and cooled. 402 g of polyamidoamine which contained 0.3 mole of benzyl groups per equivalent of nitrogen and had a chloride titer of 1.49 milliequivalents/g were obtained. The resin is useful as a retention aid for dyes and pigments.

EXAMPLE 4

402 g of the 50% strength aqueous resin solution described in Example 3 were reacted for 5 hours at 90° C. with a solution of 25 g of cyanamide in 25 g of water. 452 g of a 49.8% strength aqueous solution of a cyanamide-modified benzylated polyamidoamine were obtained.

On addition of from 0.3 to 1.0%, based on solids, of the above material to concentrate, the green strength was increased by about 20%.

EXAMPLE 5

452 parts of tris-3-aminopropylamine were introduced into a 2 liter four-necked flask equipped with a stirrer, reflux condenser, thermometer and dropping funnel, and were heated to 70° C. 120 parts of urea were then added as a single shot, after which the mixture was heated for 2 hours at 110° C. and then for 3 hours at 130°–140° C. As soon as the evolution of ammonia noticeably diminished, the contents of the flask were cooled to 120° C. in an ice-bath, and were diluted with 504 parts of water. A 49.9% strength aqueous solution of a polyamidoamine, having a viscosity of 1,100 mPa.s, was obtained. 15 parts of concentrated sulfuric acid were then added, followed by 672 parts of a 60% strength aqueous propyleneimine solution introduced at 90° C., with cooling. The addition of the propyleneimine solution, and the reaction, were complete after 4 hours at 90° C. 1,695 g of a 54.2% strength aqueous solution of a polyamidoamine were obtained. 100 parts of the 100% strength resin contained 1.22 moles of nitrogen, corresponding to 12.2 milliequivalents/g.

302 g of the propyleneimine-modified polyamidoamine were introduced into a 1 liter four-necked flask equipped with a stirrer, reflux condenser, thermometer and dropping funnel, and were heated to 90° C. The heating was then stopped and, at the same temperature, 101 g of benzyl chloride were added to a rate such that the temperature in the reaction vessel remained at 90° C. After all the benzyl chloride had been added, the reaction solution was kept at 90° C. for a further half-hour and was then diluted with 126 g of distilled water and cooled. 529 g of an aqueous 50% strength solution of a polyamidoamine modified with propyleneimine and with benzyl chloride were thus obtained. The chloride titer was 1.512 milliequivalents/g. The resin contained 0.4 mole of benzyl groups per equivalent of nitrogen. The resin can be used as a retention aid for dyes and organic pigments in the manufacture of paper.

EXAMPLE 6

529 parts of the 50% strength aqueous solution of the resin modified with propyleneimine and with benzyl chloride, according to Example 5, were reacted in a further step, at 90° C., with a 50% strength aqueous solution of 67 g of dicyandiamide. The reaction was complete after 5 hours. 663 g of an aqueous solution of a dicyandiamide-modified benzylated polyamidoamine were obtained. The reaction product is used in paper manufacture, as an assistant in coloring paper with acid dyes and direct dyes and, together with bentonite and/or aluminum salts or iron salts, as a clarifying agent for waste water.

EXAMPLE 7

520 parts of 1,4-bis-(3-aminopropyl)-piperazine were introduced into a 4 liter four-necked flask equipped with a stirrer, reflux condenser, thermometer and dropping funnel, and were heated to 100° C. 120 parts of urea were added as a single shot and the mixture was heated at 110° C. for 2 hours by means of an oil bath, and then at 140° C. for 5 hours, at which stage the evolution of ammonia had diminished significantly. The reaction mixture was then cooled to 120° C. in an ice-bath, and was diluted with 570 parts of water. A 50.2% strength aqueous resin solution was obtained. This was mixed with 235 parts of 50% strength sulfuric acid at 90° C. and reacted, at the same temperature, with 1,907 parts of 60% strength aqueous ethyleneimine solution, the addition of the solution, and reaction of the ethyleneimine with the polyamidoamine, being complete after 10 hours. 3,286 g of a 52.2% strength aqueous solution of an ethyleneimine-modified polyamidoamine, having a viscosity of 12 mPa.s, were obtained. 100 parts of the 100% strength resin contained 1.68 moles of nitrogen, corresponding to 16.8 milliequivalents/g.

228 g of the 52.2% strength aqueous resin solution were heated to 90° C. in a 1 liter four-necked flask equipped with a stirrer, reflux condenser, thermometer and dropping funnel. The heating bath was then removed and 76 parts of benzyl chloride were then added dropwise, with stirring at 90° C., at a rate which enabled this temperature to be maintained. After all the benzyl chloride has been added, the reaction solution was heated for a further 30 minutes at 90° C., diluted with 86 g of water and cooled.

390 g of a 49.9% strength aqueous solution of a benzyl chloride-modified ethyleneimine-grafted polyamidoamine were obtained. The chloride titer was 1.538 milliequivalents/g. The reaction product contained 0.3 mole of benzyl groups per equivalent of nitrogen. The product is used, in combination with FeCl$_3$, for removing anionic water-soluble compounds from the waste water of papermaking machines.

EXAMPLE 8

390 parts of the 49.9% strength aqueous resin solution described in Example 7 were reacted with 25 g of cyanamide, in the form of a 50% strength aqueous solution, for 5 hours at 90° C. 440 g of a 50% strength aqueous cationic resin solution were obtained. The solution is used, in combination with bentonite and aluminum salts (Al sulfate or alum), to remove anionic compounds (for example ligninsulfonates and carboxymethylcellulose) from the waste water of papermaking machines, and as a retention aid for anionic dyes.

EXAMPLE 9

Example 1 was repeated, but using the following, per equivalent of nitrogen, in place of 0.6 mole of benzyl chloride:

(a) 0.1 mole of benzyl chloride (assistant 9a)
(b) 0.2 mole of benzyl chloride (assistant 9b)
(c) 0.3 mole of benzyl chloride (assistant 9c).

The products obtained were tested as paper-coloring assistants, using the following method:

70 g of bleached sulfate cellulose (pine) and 30 g of bleached sulfite cellulose (beech), each with a freeness of 35°SR, were battered to give a 0.5% strength pulp suspension. 1.0 g of the acid orange dye C.I. 15,510, in the form of a 1% strength aqueous solution, was added to this suspension. After having homogenized the dye in the suspension for 10 minutes, 0.33 g of the assistant from Example 1 was added and the suspension was stirred for a further 10 minutes. Sheets weighing 80 g/m$^2$ were produced from this suspension on a laboratory sheet-forming apparatus (from Frank), and samples of the drainage water were taken. The fibers and fines were centrifuged out of this water, which was then examined for its dye content. It was found to contain 11% of the dye initially employed. The Table shows this result together with those obtained on using assistants 9a to 9c.

TABLE

| Assistant from Example | % of assistant, based on dye employed | % dye in the waste water, based on dye employed |
|---|---|---|
| 1 | 100 | 11 |
| 9a | 100 | 24 |
| 9b | 100 | 15 |
| 9c | 100 | 10 |

To determine the cylinder twosidedness of the colored paper, the moist paper was dried, without turning it, between two absorbent papers on a felt-covered cylinder, at 90° C., for 10 minutes; however, before drying, a plastic disc of 5 cm diameter was placed on the side of the moist paper which faced the felt. The paper sheets exhibited an even coloration, with no cylinder twosidedness.

COMPARATIVE EXAMPLE 1

The coloring experiment was repeated except that the cationic assistant was omitted. The drainage water was found to contain 95% of the dye employed. The coloration of the paper was very pale and uneven, with very marked cylinder twosidedness.

COMPARATIVE EXAMPLE 2

The coloring experiment was repeated, except that in place of the assistant from Example 1, a polyethyleneimine of molecular weight 1,500, which had been partially reacted with dimethyl sulfate, was employed. The drainage water contained 28% of the dye employed. The paper showed an even coloration, but with distinctly noticeable twosidedness.

We claim:
1. A water-soluble benzylated polyamidoamine which contains from 0.1 to 0.9 mole of benzyl groups per equivalent of nitrogen and onto which from 20 to 400 parts by weight of ethyleneimine or propyleneimine have been grafted per 100 parts by weight of a polyamidoamine which is the reaction product of a dicarboxylic acid of 4–10 carbon atoms with a polyalkylenepolyamine of 3–10 basic nitrogen atoms per molecule.

2. A process for the preparation of a water-soluble benzylated polyamidoamine, comprising:
preparing a polyamidoamine by reacting a dicarboxylic acid of 4–10 carbon atoms with a polyalkylenepolyamine possessing 3–10 basic nitrogen atoms per molecule;
grafting from 20 to 400 parts by weight of ethyleneimine or propyleneimine onto 100 parts by weight of said polyamidoamine; and
benzylating said alkyleneimine modified polyamidoamine by reacting 0.1–0.9 mole of benzyl chloride per equivalent of nitrogen in said polyamidoamine.

3. The process of claim 2, wherein said dicarboxylic acid is succinic acid, maleic acid, adipic acid, glutaric acid, suberic acid, sebacic acid or terephthalic acid.

4. The process of claim 2, wherein said polyalkylenepolyamine is diethylenetriamine, triethylenetetramine, tetraethylenepentamine, dipropylenetriamine, tripropylenetetramine or dihexamethylenetriamine.

5. The process of claim 2, wherein the temperature of the acid-amine condensation reaction is from 80° to 200° C.

6. The process of claim 2, wherein said reaction between said dicarboxylic acid and said polyalkylenepolyamine is conducted in the presence of a lactone or lactam of a carboxylic acid of 5 to 12 carbon atoms.

* * * * *